Patented May 7, 1946

2,399,980

UNITED STATES PATENT OFFICE 2,399,980

ADHESIVES

Lawrence Bradshaw, Bainbridge, Francis J. Morrow, Brooklyn, and Carl F. MacLagan, Bainbridge, N. Y., assignors to The Borden Company, New York, N. Y., a corporation of New Jersey No Drawing. Application June 22, 1942, Serial No. 448,016

6 Claims. (Cl. 260—39)

Dry glues containing water-soluble urea-formaldehyde type resins in powder form (e. g. spray-dried), have come into prominence during the last few years in the plywood industry. Such resins need not be simply condensation products of urea and formaldehyde but in some instances can be made by including other substances in the materials to be reacted. These fine powders are known to have certain somewhat objectionable properties, namely, (a) they tend to lump up during storage, to an undesirable extent, (b) the fine powders are extremely bulky, and (c) the powders do not flow easily. It is the main object of our invention to remove or reduce these objectionable properties. Other objects and advantages will be apparent from the following description.

Agglomeration of the material is of course objectionable since it is difficult to dissolve the material in water, to get a uniformly dissolved glue, if it contains lumps. This is particularly difficult when, as in the present case, only a very small amount of water is used for dissolving the glue (e. g. one part of water for two parts of the dry glue). The bulkiness of the fine powder necessitates the use of very large shipping containers. In some cases a 720 cc. measuring vessel, filled with the fine powder, by being poured in from a container, may hold about 300 grams to 400 grams, or by repeated tapping and mildly shaking the container, may hold about 465 grams of the powder. This latter represents a bulk specific gravity of about 0.64. In accordance with the present invention, we can increase this bulk specific gravity somewhat. Also the powders do not flow well, as through a narrow outlet in the bottom of a vessel. In pouring, the powder tends to arch and thereby stop the flow.

We have found that the fine glue powder, of the type mentioned, can be improved in these three features, and without reducing the effectiveness of the wet glue, by making suitable additions thereto.

Our investigations have shown that by adding to the very fine bulky spray dried material, certain very finely pulverulent materials, in air-dry state, a useful improvement can be effected. To be effective, extremely fine powder is necessary. Satisfactory results can be secured when the "conditioners" or added substances are of such fineness that a preponderating amount of the substance is finer than 5 microns, although the substance may still contain some particles of 5 to 20 microns in size, or even larger, but the amount of the conditioner which is above 5 microns in size should preferably be small, e. g. not over 15-20% (based on the whole amount of the conditioner). The amount of the conditioner to be added may advantageously be about 2%, based on the dry resin, but other amounts between 0.5% and 3%, more or less, can be used. In any event, the amount of the conditioner will be small.

The best conditioner thus far tried by us is the normal aluminum phosphate, $AlPO_4$ but other insoluble aluminum compounds and certain other insoluble phosphates are, in many cases, also satisfactory.

Among the other insoluble aluminum compounds which may be employed is clay (e. g. china clay), especially the colloidal grades. There may also be employed silica in the extremely fine state, so-called "silica smoke," and this latter, reground to a still finer degree, can also be used. Iron phosphate is satisfactory although it imparts some color. Nickel and cobalt phosphates are also effective. Manganous phosphate and zinc phosphate are of less importance. These last four are less desirable as being more expensive or relatively less potent. Talc is one of the materials we have experimented with, and this material is available in the form of a fine impalpable powder (e. g. face powder). One of these very fine talc powders was added to the fine resin, but was found to be comparatively ineffective. Another fine talc powder was fairly effective. Due to the variability and uncertainty of this mineral, we make no claim herein to its use in the present invention.

As a specific example of our invention: Aluminum phosphate was first ground to pass a 300 mesh screen. This material was not very effective as a conditioner for the fine spray-dried resin powder. We placed the 300 mesh material in a pebble mill and ground it until extremely fine, so that 80% of the substance was finer than 4 microns in particle size. 2% of this material was added to the resin, and the mass well mixed. The resulting product was found to be free-flowing, non-lumping, and less bulky than the original resin. It was found that the gluing properties of the mixture were about equal to those of the original spray-dried resin. The jelling of the liquid glue prepared by mixing the product with water and adding a given amount of accelerator was retarded a little but the final hardening time was not changed. The mixing of the conditioned glue-powder with water was on the basis of 2 parts of the dry glue to 1 part of water.

It is a common practice to add to the urea-formaldehyde type resins a small amount of an accelerator such as an ammonium salt of a strong acid, to accelerate the setting and hardening of the resin in the glue-line, for example in making plywood. Such accelerators in the dry state may be incorporated in the resin powder, and it is customary to use a definite proportion (e. g. 2% of ammonium sulphate) so that, after the addition of the prescribed amount of water the fluid resin will set and harden within certain desired limits of time.

The conditioners which we prefer to employ are substances which do not considerably accelerate or retard the jelling and the hardening of the glue. Thus, bulky tri-magnesium silicate seems to have some useful anti-caking effect, but it also has a strong retarding effect on the glue, and accordingly we do not include this in the present invention.

The fact that a given material gives a substantial increase in the bulk specific gravity, is not alone enough to prove that it will prevent lumping, over long storage. As an example, we added to one portion of a resin glue-base 2% of fine reground normal aluminum phosphate and to another portion 2% of fine reground "silica smoke," of about the same degree of fineness. The volume-reducing capacities of these were substantially alike, as shown by the following:

|  | Wt. of 720 cc. | |
|---|---|---|
|  | Loose fill | Pack |
|  | Gr. | Gr. |
| Resin powder #19 | 384 | 462 |
| Aluminum phosphate, 2% | 473 | 538 |
| Silica smoke, 2% | 472 | 529 | but after the powders had been kept in storage for several months the one containing the phosphate was in better condition than the other; both were good but the powder containing the phosphate was superior in "flow." Therefore as between the substances mentioned above our preference is for the phosphates, with the silica dust and colloidal clays in second place.

We give in Table I, below, the effects produced by adding 2% of several proposed conditioners and other materials. The bulk density figures show the weight of materials held by a standard container having a volume of 720 cc. First the container is loosely filled and the contents weighed. Then the contents are shaken down by tapping and further powder added with continued tapping until the container holds its maximum pack. Note that the good conditioners reduce the volume of the resin considerably, so that a greater weight can be charged into a given container. The figures are probably not absolutely accurate but are near enough for practical purposes and illustrate the point. After the packing tests are finished 2% of ammonium sulphate (accelerator) is added to the mixture of resin powder and conditioner and the whole is subsequently mixed with water in the proportion of about two parts of the glue powder to one part water which produces a resin glue of workable viscosity. The time at which this liquid glue sets to a soft gel is then determined. For example, if the resin without conditioner sets in 2 hours and that containing the conditioner sets in 2¼ hours, we would not consider this as a serious retardation. Other factors may influence the setting time and a difference of 10% either way is not of much consequence. Only wide differences, where the trend is unmistakable, are taken into account. This is particularly true of the "glass-hard" time. It is difficult to determine within an hour or two when the resin is completely indurated; the figures furnish a rough index.

In Table I the resin employed in Test A jelled at 2½ hours and became glass-hard at 7 hours; in Test B a faster jelling resin was used.

*Table I—Bulk density and setting times*

(Using 2% conditioner in each case)

|  | Wt. of 720 cc. | | Soft jel | Glass hard |
|---|---|---|---|---|
|  | Loose fill | Pack |  |  |
|  | Gr. | Gr. |  | Hr. |
| Test A: |  |  |  |  |
| Resin powder #3, blank test | 305 | 465 | 2½ hr | 7 |
| Aluminum phosphate, reground | 426 | 518 | 3 | 7 |
| Ferric phosphate, reground | 390 | 488 | 2½ | 8 |
| Nickel (ous) phosphate, reground | 393 | 485 | 3½ | 11 |
| Cobalt (ous) phosphate, reground | 425 | 505 | 3½ | 13 |
| Zinc phosphate, reground | 355 | 482 | 2½ | 12 |
| Silica "smoke" | 360 | 478 | 2½ | 10 |
| Talc #1, "micronized" | 339 | 485 | 2½ | 9 |
| Test B: |  |  |  |  |
| Resin powder #19, blank test | 384 | 462 | 55 min | 5½ |
| Aluminum phosphate, reground | 473 | 538 | 60 min | 5 |
| Clay No. 1 "micronized" | 416 | 515 | 55 min | 5¼ |
| Clay No. 2 | 437 | 494 | 56 min | 5½ |
| Clay No. 3, colloidal | 469 | 522 | 60 min | 5½ |
| Silica "smoke" | 439 | 511 | 60 min | 5½ |
| Silica "smoke," reground | 472 | 529 | 58 min | 5½ |

It is not essential that the accelerator be incorporated in the dry mixture of resin powder and conditioner. Alternatively, the accelerator may be added to the fluid glue prepared by mixing the conditioned resin powder with water, and may be in the form of a solid, a liquid or a solution.

In the appended claims we employ the term "glue-base" to designate a dry material which is adapted to be subsequently mixed with water or an aqueous liquid to form a fluid spreadable glue. The mixing of the glue-base with water will usually be performed by the user (e. g. plywood manufacturer).

It will be understood that we may use two or more of the conditioners, if desired.

We claim:

1. A dry glue-base, to be mixed with less than its own weight of water to form a spreadable glue, which contains a pulverous urea-formaldehyde condensation product which is at least largely water-soluble intimately mixed with from about 0.5% to about 3% of its weight of a conditioner selected from the group consisting of aluminum phosphate, ferric phosphate, silica and clay, such conditioner being in the form of a fine powder at least the preponderating part of which is in the form of particles not substantially larger than 5 microns.

2. A dry glue-base to be mixed with water, which contains a pulverous urea-formaldehyde condensation product which is at least largely water-soluble and about 0.5% to about 3% of fine silica smoke, the latter being a fine powder consisting in predominating part at least, of particles not over 5 microns in size.

3. A dry glue-base to be mixed with water, which contains a pulverous urea-formaldehyde condensation product which is at least largely water-soluble and about 0.5% to about 3% of fine clay, the latter being a fine powder consisting in predominating part at least, of particles not over 5 microns in size.

4. A dry glue-base capable of being mixed with water, which contains a substantially water-soluble pulverulent urea-formaldehyde condensation product in admixture with about 0.5% to about 3% of its weight of a conditioner selected from the group consisting of aluminum phosphate, ferric phosphate, silica, and clay, the greater proportion of which conditioner is substantially finer than 300 mesh, which conditioner reduces agglomeration in said condensation product and which is capable of substantially increasing the bulk density of such condensation product, and which conditioner does not substantially change the speed of setting of the liquid glue made by mixing the glue-base with water.

5. A dry glue-base capable of being mixed with water, which contains a substantially water-soluble pulverulent urea-formaldehyde condensation product in admixture with about 0.5% to about 3% of its weight of finely divided aluminum phosphate, a preponderating amount of said aluminum phosphate being in the form of particles not larger than 5 microns in size.

6. A dry glue-base to be mixed with water, which contains a pulverulent urea-formaldehyde condensation product which is at least largely water-soluble, in admixture with a substantial and influential amount but not more than a few per cent of a finely pulverulent aluminum phosphate finer than 300 mesh.

LAWRENCE BRADSHAW.
FRANCIS J. MORROW.
CARL F. MacLAGAN.